May 31, 1966  B. H. SHINN  3,253,958
FUEL CELL STACK WITH TORSION BAR SEAL FOLLOW-UP

Filed Feb. 28, 1962  2 Sheets-Sheet 1

INVENTOR
BYRON H. SHINN
BY Charles Alkeren
ATTORNEY

May 31, 1966 B. H. SHINN 3,253,958
FUEL CELL STACK WITH TORSION BAR SEAL FOLLOW-UP
Filed Feb. 28, 1962 2 Sheets-Sheet 2

INVENTOR
BYRON H. SHINN
BY Charles A. Warren
ATTORNEY

United States Patent Office 3,253,958
Patented May 31, 1966

3,253,958
FUEL CELL STACK WITH TORSION BAR SEAL FOLLOW-UP
Byron H. Shinn, Bolton, Conn., assignor to United Aircraft Corporation, East Hartford, Conn., a corporation of Delaware
Filed Feb. 28, 1962, Ser. No. 176,508
3 Claims. (Cl. 136—86)

This invention relates to a spring clamping device and particularly to a device for clamping a stack of fuel cells together. The invention described herein was made in the performance of work under a NASA contract and is subject to the provisions of the National Aeronautics and Space Act of 1958, Public Law 85–568 (72 Stat. 426; 42 U.S.C. 2451), as amended.

Where a plurality of fuel cells are assembled together as is frequently necessary in order to obtain the necessary power output, the assemblage of cells must be held together in such a way that the electrolyte within each cell will be retained within the space provided for it and held together under a pressure substantially greater than the pressure of the fuel and oxidant supplied to the cells. Further, many fuel cells operate at high temperatures with the result that substantial changes in dimension occur as the result of thermal expansion as the cell becomes operative. One feature of the invention is an arrangement for holding the assemblage of cells together under a resilient clamping action. Another feature is the use of a torsion bar for obtaining the clamping action. Another feature is the use of a clamping action with a large follow-up to compensate for plastic flow and consequent thinning of sealing gaskets.

One feature of the invention is an arrangement for resiliently clamping a plurality of devices together under a torsion bar action such that the same clamping pressure is applied to all portions of the device being clamped. Another feature is a torsion bar clamping action in which a plurality of spaced clamping elements may be applied over a large area with a substantially uniform clamping action.

Other features and advantages will be apparent from the specification and claims and from the accompanying drawings which illustrate an embodiment of the invention.

Figure 1:
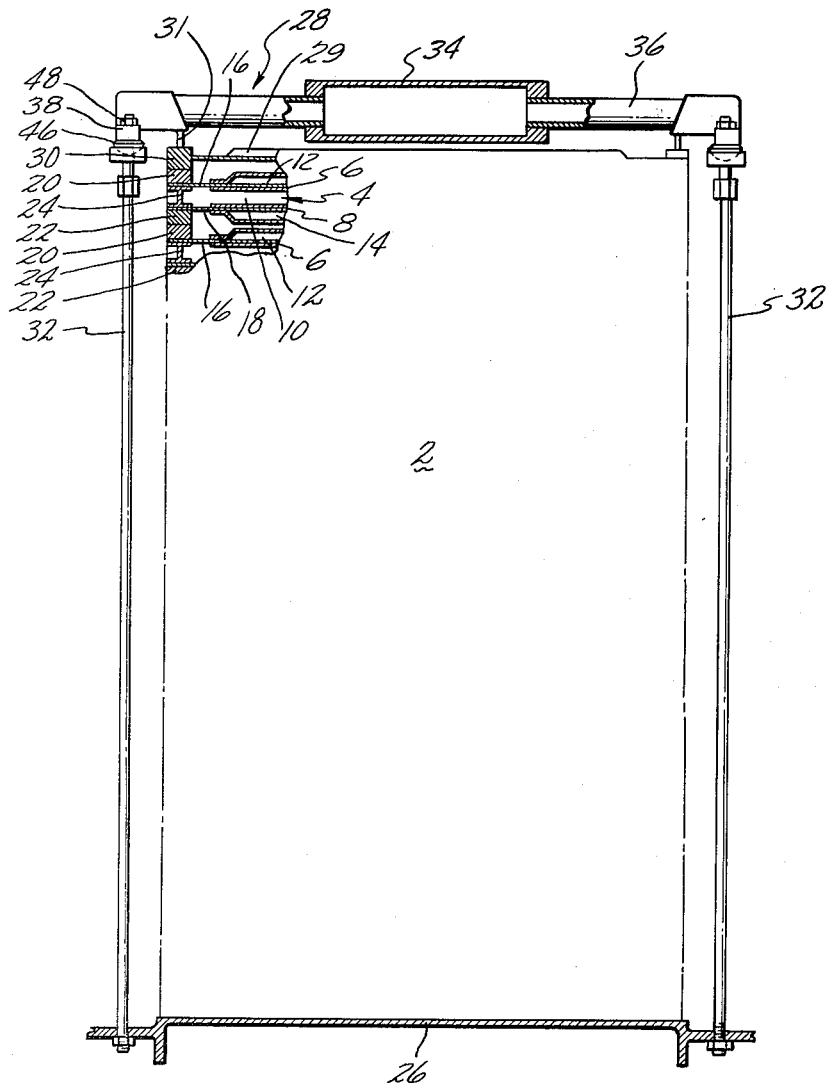
Figure 2:
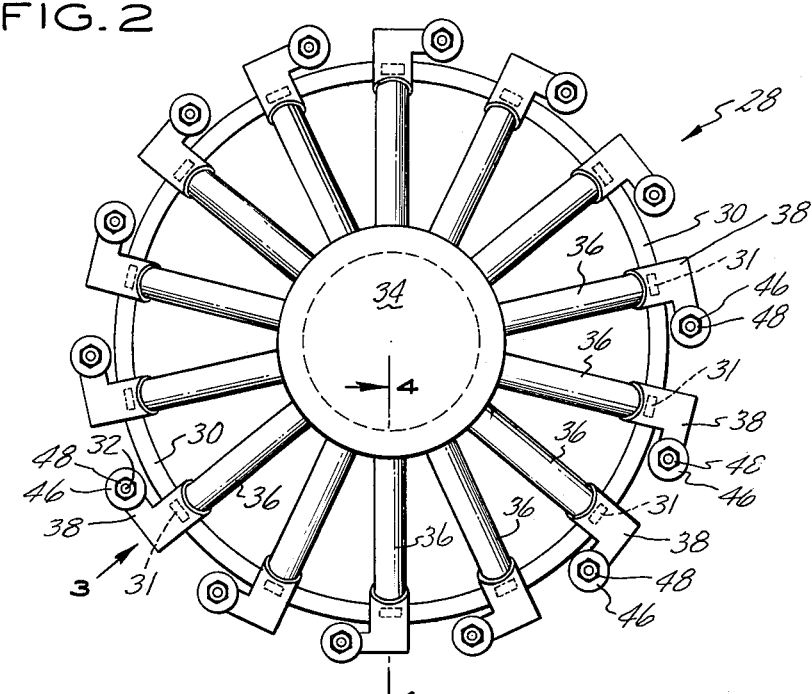
Figure 3:
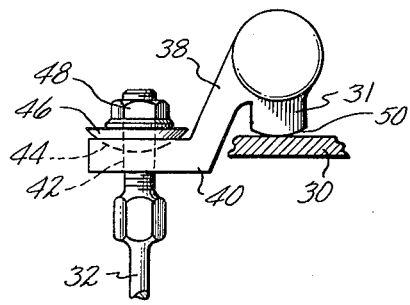
Figure 5:
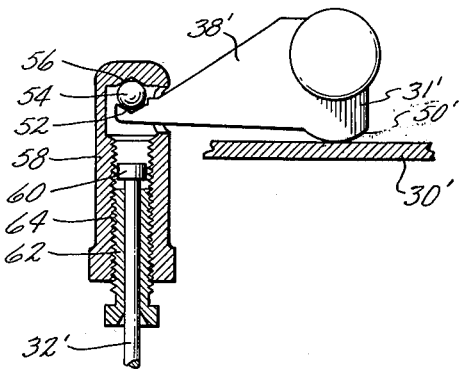
Figure 4:
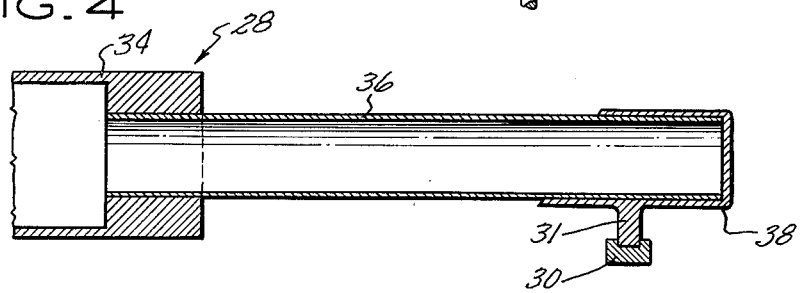

FIG. 1 is a vertical sectional view through a fuel cell assemblage.
FIG. 2 is a plan view looking at the top of the devices.
FIG. 3 is a fragmentary elevation view looking in the direction of the arrow 3 in FIG. 2.
FIG. 4 is a sectional view along the line 4—4 of FIG. 2.
FIG. 5 is a view similar to FIG. 3 of a modification.

The invention is shown in connection with a fuel cell modulus 2 which includes a plurality of individual fuel cells 4 arranged in a stack. Each cell includes a pair of spaced electrodes 6 and 8 which are spaced apart to define a chamber 10 for an electrolyte. Each of the electrodes is hollow to provide in one electrode 6, a space 12 for fuel and in the other electrode 8 a space 14 for oxidant. The walls of the electrodes in contact with the electrolyte are porous to provide for contact between the electrolyte and the fuel and oxidant fluids within the porous walls.

The electrodes 6 and 8 have peripheral discs 16 and 18 attached thereto and on the periphery of the discs are rings 20 and 22. These rings 20 and 22 are positioned on the outer surfaces of the discs 16 and 18 with respect to each individual cell. Between the discs 16 and 18 is a seal 24 in line with the rings 20 and 22 to define a closure at the periphery of the electrode space 10.

As shown in FIG. 1, all of the rings 20 and 22 and the seals 24 are in stacked relation so that pressure applied in an axial direction on the assemblage of rings and seals will provide a leak-proof connection at the seal. It will be apparent that the ring 22 of one cell and the ring 20 of the next adjacent individual cell is of such a dimension that the electrode 8 of the first cell and the adjacent electrode 6 of the contiguous cell will be held in proper spaced relation to one another when the rings 20 and 22 are in contact, as shown.

The stack of fuel cells is located between a base plate 26 and a clamping plate 28 with the top clamping plate in engagement with a closure plate 29 having a peripheral ring 30 through the medium of projections 31 on the clamping plate. A ring of tie bolts 32 surround the stack of fuel cells with the tie bolts extending between the bottom and clamping plates so that by tightening down these bolts the necessary clamping pressure may be applied to the rings 20 and 22 and the seal rings 24.

The clamping plate 28 as best shown in FIG. 2 consists of a center support 34 having projecting therefrom a plurality of radially extending tubes 36 which form torsion bars constituting spring elements each of which is secured against rotation within the support 34. The outer end of each tube 36 has mounted thereon a laterally extending arm 38 terminating in a flat arm end 40 having an opening 42 therethrough and having a part spherical recess 44 in its upper surface. This recess receives a similarly shaped washer 46 which is engaged by a clamping nut 48 on the upper end of one of the tie bolts 32. Thus as the clamping nut 48 is tightened the arm 38 will be carried counterclockwise against the resistance of the tube 36. Adjacent to the arm 38 the spacer 31 which engages with the ring 30 is mounted. As shown in FIG. 3 this spacer has an arcuate surface 50 which engages with the ring 30. Thus as the arm 38 moves counterclockwise through a small angle the surface 50 will roll on the ring 30.

It will be apparent that each tube 36 extending outwardly from the support 34 carries a similar arm 38 there being one tube and accompanying arm for each of the tie rods. In this way a clamping pressure is provided at closely spaced circumferential points uniformly located about the circumference of the ring 30. The resilience of the tubes 36 may be so selected that with respect to the angle and length of the lever arm 38 there will be a very low change in the tension in rod 32 within the normal range of axial variation in the fuel cell system. The adjustment of the tie bolts provides for a torquing of each of the torsion bars to a predetermined load to furnish a low spring rate tension device for each of the axially extending tie bolts.

Referring now to FIG. 5 the arrangement shown utilizes a different attachment between the tie rod 32′ and the lever 38′. In this arrangement the outer end of the lever 38′ has a notch 52 engaging with a ball 54 received in a socket 56 in a cap 58 fitting over a head 60 on the end of the tie rod 32. A threaded sleeve 62 surrounding the tie rod below the head 60 engages a threaded portion 64 in the socket 56 to provide for adjustment of the length of the tie rod and thereby to control the torque on the associated torsion tube.

It is to be understood that the invention is not limited to the specific description above or other specific figures, but may be used in other ways without departure from its spirit as defined by the following claims.

I claim:
1. The combination with a plurality of fuel cells arranged in stacked relation and each having peripheral rings thereon, seals located between adjacent rings to retain the electrolyte in the individual cells, clamping means for holding the stack of fuel cells together and spring means at least at one end of the stack between said clamping means and the peripheral rings, said spring means comprising a central support spaced from the end of said stack of cells and a plurality of torsion bars connected to said support and extending radially therefrom, said torsion bars including means engaging only with said stack of cells adjacent to the outer perimeter, the outer ends of said torsion bars being engaged by said clamping means.

2. The combination as in claim 1 in which each torsion bar has an arm extending therefrom at the outer end in a direction circumferentially of the stack of cells, the ends of the arms being engaged by the clamping means.

3. The combination as in claim 1 in which the means on the torsion bars engaging with the stack of cells is in alignment with the peripheral rings carried by the cells.

References Cited by the Examiner
UNITED STATES PATENTS 2,969,315 1/1961 Bacon _____ 136—86
3,068,311 12/1962 Chambers et al. _____ 136—86

FOREIGN PATENTS 350,100 8/1905 France.

ALLEN B. CURTIS, Primary Examiner.

JOSEPH REBOLD, WINSTON A. DOUGLAS,
Examiners.

H. FEELEY, Assistant Examiner.